United States Patent
Thompson et al.

(10) Patent No.: US 7,250,917 B1
(45) Date of Patent: Jul. 31, 2007

(54) DIRECTIONAL WIRE ANTENNAS FOR RADIO FREQUENCY IDENTIFICATION TAG SYSTEM

(76) Inventors: Louis H. Thompson, 792 Buckeye Ridge, Mt. Vernon, GA (US) 30445; Sheree Hagan, 246 Oren Sharpe Rd., Vidalia, GA (US) 30474

( * ) Notice: Subject to any disclaimer, the term of this patent is extended or adjusted under 35 U.S.C. 154(b) by 206 days.

(21) Appl. No.: 11/033,888

(22) Filed: Jan. 13, 2005

Related U.S. Application Data

(60) Provisional application No. 60/536,258, filed on Jan. 14, 2004.

(51) Int. Cl.
*H01Q 9/30* (2006.01)
(52) U.S. Cl. .................... 343/828; 340/572.7; 343/789
(58) Field of Classification Search ................ 343/789, 343/795, 700 MS, 828; 340/572.7
See application file for complete search history.

(56) References Cited

U.S. PATENT DOCUMENTS

| | | | |
|---|---|---|---|
| 1,843,445 A | 2/1932 | Chireix | |
| 1,907,945 A | 5/1933 | Franklin | |
| 1,987,780 A | 1/1935 | Latour | |
| 2,065,787 A | 12/1936 | Berndt et al. | |
| 2,647,211 A | 7/1953 | Smeby | |
| 2,780,808 A | 2/1957 | Middlemark | |
| 2,929,063 A | 3/1960 | Lynn, Jr. | |
| 3,089,141 A | 5/1963 | Odenwald | |
| 3,389,395 A | 6/1968 | Lejkowski | |
| 5,103,238 A | 4/1992 | Mahnad | |
| 5,317,309 A | 5/1994 | Vercellotti et al. | |
| 5,600,339 A | 2/1997 | Oros | |
| 5,719,794 A | 2/1998 | Altshuler et al. | |
| 5,936,590 A * | 8/1999 | Funder | 343/795 |
| 5,995,064 A | 11/1999 | Yanagisawa et al. | |
| 6,097,347 A | 8/2000 | Duan et al. | |
| 6,166,637 A | 12/2000 | Cyr et al. | |
| 6,229,445 B1 | 5/2001 | Wack | |
| 6,340,932 B1 | 1/2002 | Rodgers et al. | |
| 6,351,215 B2 | 2/2002 | Rodgers et al. | |
| 6,362,737 B1 | 3/2002 | Rodgers et al. | |
| 6,434,369 B1 | 8/2002 | Kanayama | |
| 6,456,246 B2 | 9/2002 | Saito | |
| 6,573,876 B1 | 6/2003 | Maroko et al. | |
| 6,621,410 B1 | 9/2003 | Lastinger et al. | |
| 2003/0006937 A1 | 1/2003 | Sekine et al. | |

\* cited by examiner

*Primary Examiner*—Michael C. Wimer
(74) *Attorney, Agent, or Firm*—Dowell & Dowell P.C.

(57) ABSTRACT

Directional wire antennas for use in article or personal tracking and/or inventory monitoring or control systems wherein the antennas are specifically configured to provide a tunable vertical beam angle which is less than their horizontal beam angle. The antennas are modified or non-balanced dipole or monopole structures having non-symmetrical wire legs wherein at least one leg has segments extending angularly in a linear manner in two separate planes. In preferred embodiments the antennas are designed to receive signals from active RFID (radio frequency identification) tags placed on objects to be monitored within confined or defined structures without bleed over of signals from tags placed on objects at different vertical levels of the structure.

19 Claims, 7 Drawing Sheets

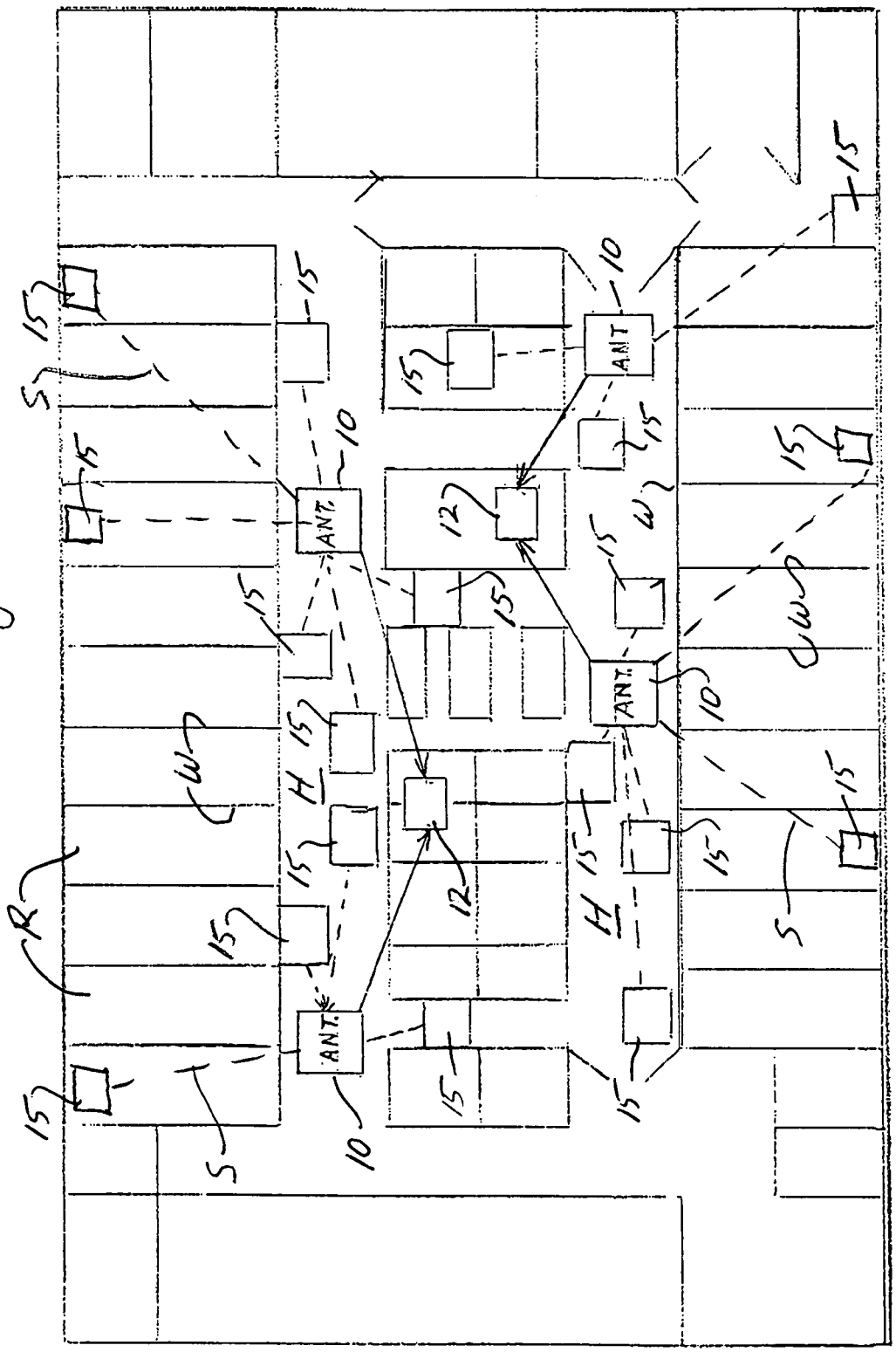

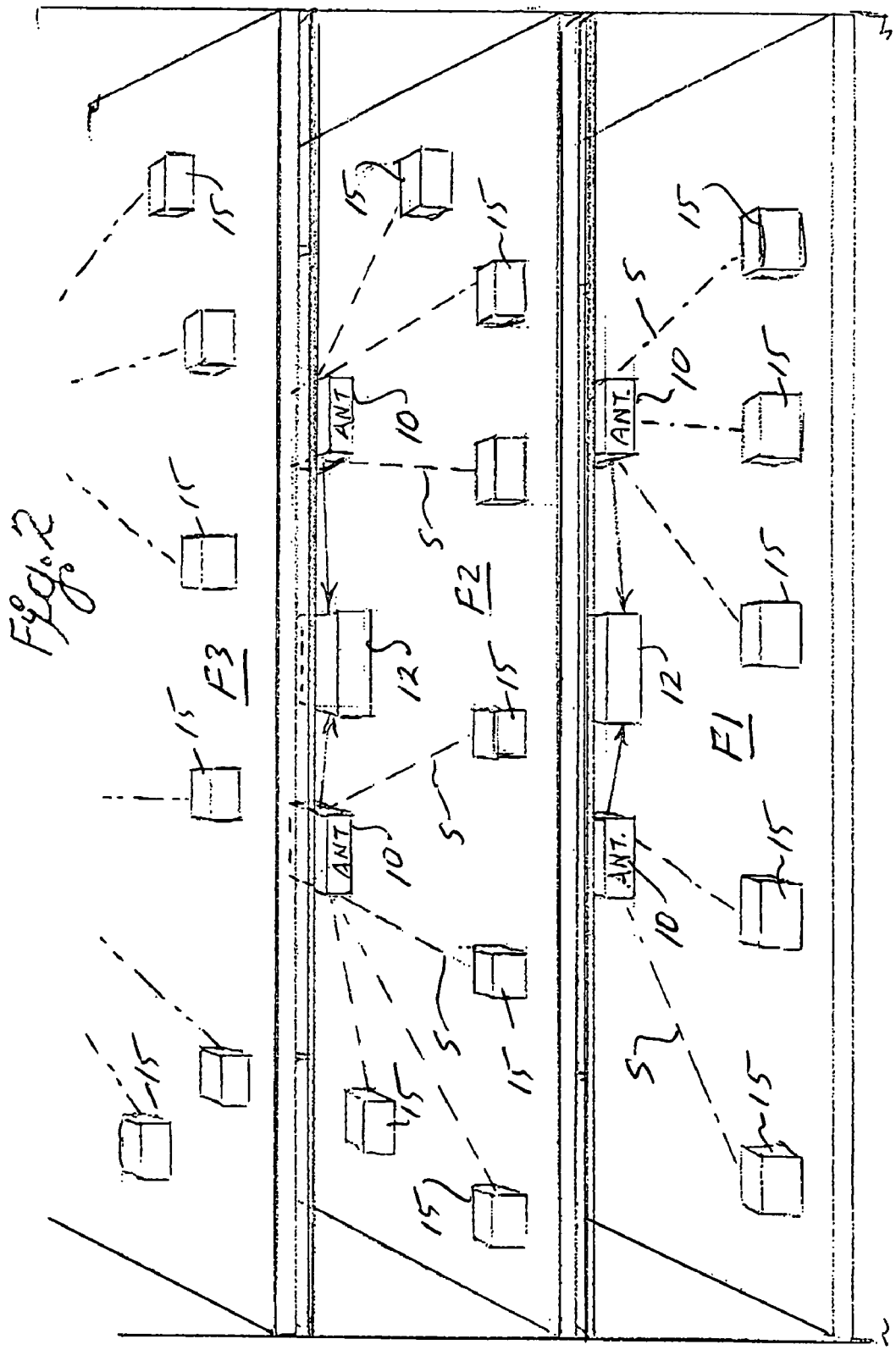

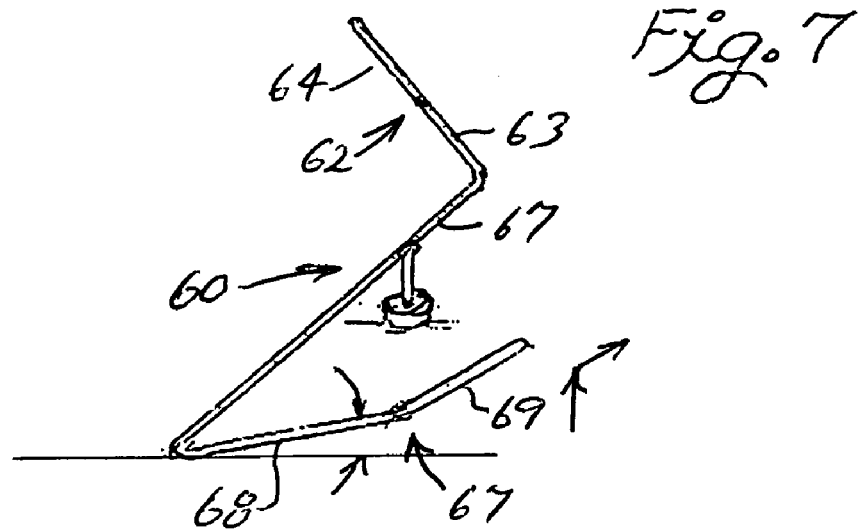
Fig. 7
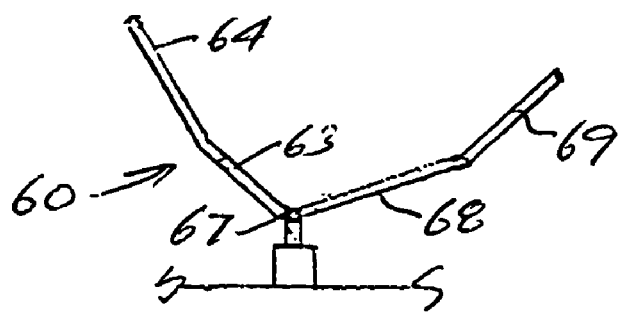
Fig. 8
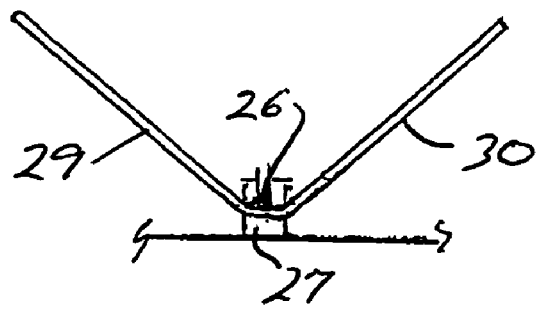
Fig. 9

DIRECTIONAL WIRE ANTENNAS FOR RADIO FREQUENCY IDENTIFICATION TAG SYSTEM

CROSS REFERENCE TO RELATED APPLICATIONS

This application claims the benefit of U.S. Provisional Application Ser. No. 60/536,258, filed Jan. 14, 2004, in the name of the same inventors and entitled DIRECTIONAL WIRE ANTENNAS FOR RADIO FREQUENCY IDENTIFICATION TAG SYSTEMS.

BACKGROUND OF THE INVENTION

1. Field of the Invention

This invention is generally directed to antennas and more specifically to wire or rod type antennas which are directional and which are specifically designed to focus receipt of signals from predetermined areas such that the vertical and horizontal extent of the signals being received can be regulated to prevent bleed such as from one floor to another in a multi-level building or structure.

2. History of Related Art

Radio frequency identification systems are well known for object and personnel tracking, surveillance, inventory control and the like wherein either active or passive RFID tags are placed on objects or personnel to be monitored. Each tag is provided with a unique code which, if passive, is activated upon the receipt of radio frequency (RF) energy to reflect a signal to a detector which signal carries a unique signature for the tag. In an active tag system the tag also carries unique information, however, the information is periodically broadcast to a detector or sensor mounted in a remote location through energy supplied by a battery associated with the active tag. The timing of the lumination of energy from the tag can be built into the tags during their manufacture. In some RFID systems, tags can be used having both active and passive characteristics.

It is often desirable to use RFID systems in multi-level confined areas such as within multi-floored buildings including warehouses, hospitals, manufacturing facilities and the like to monitor various equipment, articles, supplies and the like which are present. By way of example, in a hospital setting, there is important equipment which must be readily available and its location known at all times. By placing an RFID tag on such equipment and providing appropriate sensors within the hospital environment, the current location of the equipment is always known. In some instances, monitoring can be provided to prevent theft as well as to insure for inventory control. Further, some equipment, especially in hospitals, should not be moved out of certain protected environments such as equipment utilized for X-Ray purposes and the like. By monitoring tags associated with such equipment, it is possible to ensure that the equipment is maintained in a safe and controlled environment at all times.

RFID systems which are currently in use generally operate either using omnidirectional transceivers, for passive tag systems, or receivers, for active tag systems. The omnidirectional nature of the transceivers or receivers is predicated upon the configuration of the antennas which are used for broadcasting or receiving radio frequency signals.

Generally each tag of a passive or an active system is designed to operate at a generally specific frequency which frequency may be chosen to suit a particular environment. That is, the frequency is chosen so as not to interfere with other radio frequency equipment which may be located within a facility or in the environment of the RFID tag system. Currently, systems are designed which operate both at high frequency wavelengths as well as relatively low frequency wavelengths.

One problem that has resulted with RFID monitoring systems is that often tags outside a given detection zone can be detected by a transceiver or receiving antenna. Thus the antenna may supply false signals to an analyzer or detector device which is monitoring objects within a given area. By way of example, in a multistory building using conventional transceiver and receiving omnidirectional antenna structures, signals are often received from passive or active tags from objects which are located at levels above or below a given floor on which a detector or sensor is mounted. When bleed-over signals are received, it is possible that a false location of a particular object will be provided to the operators of the tag system because an article is on or located at a different vertical location than predicted by the sensors.

With conventional systems utilizing the omnidirectional antenna transceivers or receivers, it has generally been the practice to utilize transceivers or receiving antennas which are electrically connected to control readers or the like such that a fields of coverage of the antennas overlap one another to give as complete a coverage to the area being monitored as is possible. Unfortunately, overlapping not only occurs through a horizontal beam width of any signal being transmitted or received but also vertically. In view of the foregoing, it is often necessary to provide additional control equipment so that a true location can be determined for RFID tags by comparing the various signals being received at each location to determine signal strengths both in a vertical and horizontal direction to identify the probable location of the tags detected. This results in duplication of detection and antenna equipment thereby elevating the costs of such systems.

As described, in radio frequency identification systems which are utilized in enclosed environments including multiple level structures, there is often a bleed-over of RF frequencies being generated from tagged objects from one floor to another. To avoid confusion and to accurately locate objects, it is often necessary to place secondary sensors or signal generators at different locations along each floor of the building which provide specific information as to the location of the signal generators within the structure. The signals generated can be received by antennas and processed in order to determine a signal strength that should be received from a specific location. This requires that hardware and software be provided for the operating system so that the system is able to differentiate the signals being received depending upon the strength of the signals and angle or direction of the signals being received. Such signals, however, are affected by the types of building material being used within a structure, such as within the walls of the structure or in the floors of the structure, which materials affect the signals. By using known signal generators, when signals are received from the tags placed throughout the structure, the computing software can differentiate between the various locations. Placing known location signal generators throughout a structure increases the overall cost and complexity of an RFID system and makes such monitoring systems prohibitively expensive for use in many environments.

A zone based radio frequency identification system is described in U.S. Pat. No. 6,552,661 to Lastinger et al., the contents of which are incorporated in their entirety by reference. The system provides for determining whether or not identification devices, such as RF tags, are located within a particular zone. Therefore, a building is divided into separate zones and the zones are determined by providing different locator signals within each zone to establish boundary levels for signals. In this manner, by comparing the signals from predetermined placed devices, it can be determined when a tag being monitored is within a particular zone.

In view of the foregoing, there is a need to provide for antennas for use with transceivers or receiving type antennas utilized with RFID tag systems which can be used to specifically monitor tagged objects on a specific floor of a multistory building or structure without receiving bleed-over signals from adjacent floors and further to provide such systems wherein substantially all areas of a given floor are effectively covered by the radio frequency receiving antennas to ensure that an object can be located regardless of its position along a specific floor utilizing a minimum number of receiving and/or transceiver antennas.

BRIEF DESCRIPTION OF THE DRAWINGS

A better understanding of the invention will be had with respect to the accompanying drawings wherein:

FIG. 1 is a top plan view showing one level of a building having a plurality of antennas of the type described herein with respect to the present invention which are placed to receive signals from radio frequency tags mounted to objects at various areas of the floor;

FIG. 2 is a cross-sectional illustrational view of a plurality of floors of a building showing the directional characteristics of the antennas of the present invention as they are mounted so as to receive signals from radio frequency tags placed on objects of a given floor only without receiving bleed over signals from tags placed on objects on other floors of the structure;

FIG. 7 is a perspective view of the antenna embodiment shown in FIG. 6;

FIG. 8 is a side view of the antenna shown in FIG. 7;

FIG. 9 is a side view of the antenna shown in FIG. 3;

DESCRIPTION OF THE PREFERRED EMBODIMENTS

Figure 4:
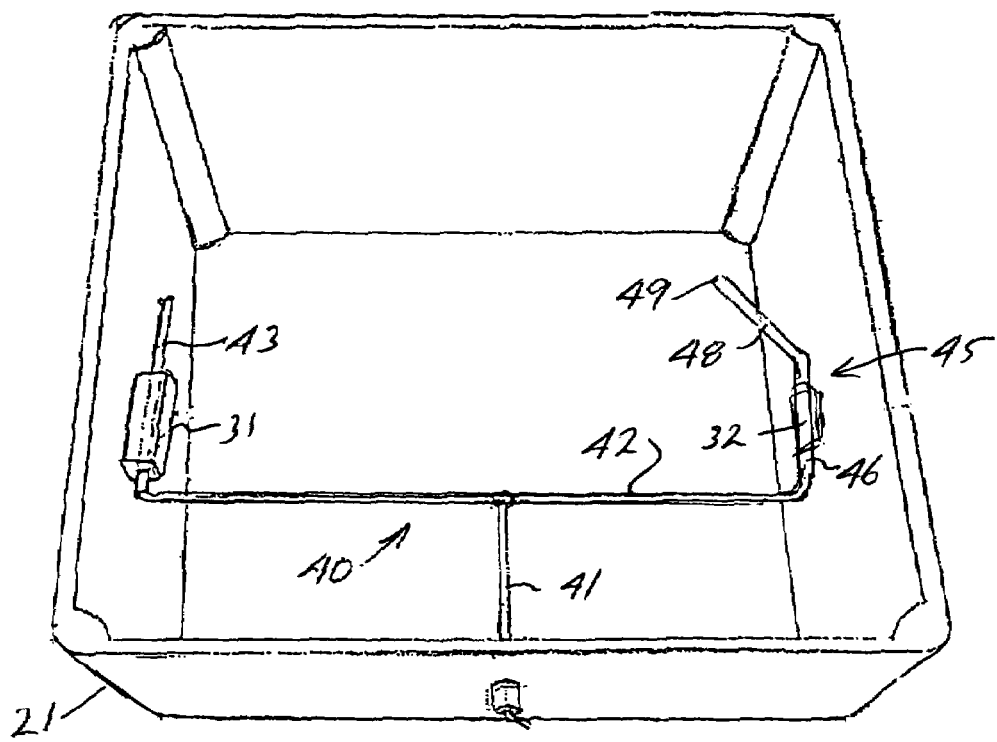
FIG. 4 is a top perspective view of a second embodiment of directional antenna mounted within a protective housing.

AS previously described, the present invention is directed to directional antennas which are used in confined environments and especially in buildings having multiple levels wherein items or objects within the building are provided with identification tags. In the preferred embodiment to be described, the tags are active RF tags which means that they are provided with a source of power such as a small DC battery having a lifetime expectancy of anywhere from three months to five years. The battery powered circuits which are associated with the tags can be adjusted so as to provide identification of the articles to which they are attached and with respect to other information which is to be generated by the tags. Many such tags are motion sensitive which means that they are not activated until an object is moved. At that time, the tags are activated and provide an RF signal which is captured by antennas which feed signals to readers and to a computer or other type of processor to give an indication not only of the location of the object but any movement of the object. the antennas, however, may be used to receive RF signals from passive tags.

The present invention is directed to antennas which are directionalized such that a vertical beam angle of any signal being received is controlled. The antennas are configured to receive signals in a given operating frequency range such that signals from tags placed on objects at different floors of a structure will either not be received or will be received only at minimum levels and therefore can be automatically discarded by a computing system as not being within the vertical range or scope of an area being monitored by the antennas.

Therefore, the vertical beam angle of the antennas of the present invention are specifically designed to operate at a minimum angle which is significantly less than the horizontal beam angle. The antennas of the present invention can be placed such as in a ceiling or depending from a ceiling or mounted to some other surface within a building so as to monitor RF tags placed on objects generally along a given floor without receiving interference signals from tags placed either above or below the floor of interest.

Although the invention will be described with respect to the antennas as being receiving antennas used with active or powered radio frequency identification tags, it is possible that the antennas can be used with transponder type systems where the tags are passive and are activated by signals being supplied by one or more antennas. Thereafter signals being reflected from the passive tags are received by the antennas.

One type of active tag which may be placed on objects to be controlled or located is manufactured by RF Code, Inc., and known as a MANTIS™ tag. Such tags are motion activated and have optional beam intervals which can be set between one (1) second to ten (10) minutes. The operating frequence of the tags is 303.8 MHz. The tags may be coded and provided in groups with up to four billion identifications. They are generally 2.4 inch by 1.2 inch by 0.4 inch in dimension and have a beacon strength of an average of 33 dbm (5.01 micro Watts). Such tags have an operating temperature in the range of −20 degrees centigrade to 60 degrees centigrade and are powered by a small battery formed as a coin cell having a 6 to 7 year life which provides a continuous beacon at every 12.5 second intervals.

With specific reference to FIG. 1, a top plan view of a floor of a multistory structure, such as a warehouse, a hospital, an office complex, a factory or the like is disclosed as having a plurality of rooms "R" which are divided by interior walls "W". Hallways, "H", are shown as extending with exit areas at each end of the floor. The present invention provides antenna devices 10, two of which are shown as being mounted in each hallway "H" in a manner so as to provide effective coverage between the interior walls of substantially the entire floor as shown by the shading in FIG. 1. Each of the antenna devices 10, is communicated with a reader 12, either by a hard wire connection or by connection by ethernet connection or a "blue tooth" type wireless communication system in accordance with 808.11B protocol.

As shown, the system provides for two readers 12, one covering each half of the floor with each reader being connected to two antennas 10. The number of readers and antennas will depend on the size of the structure. However, using the antennas of the present invention, it is possible to effectively cover an area of a single floor of the structure of approximately 175 feet from the antennas. The antennas receive signals from RFID tags 15, which are placed on objects within the structure. The objects may vary depending upon the environment in which the antennas are used. Further, although two antennas are shown as being provided in each corridor or hall "H", depending upon the size of the structure, one or more such antennas may be used as necessary to provide for complete coverage throughout a given structure.

With specific reference to FIG. 2, the same structure of FIG. 1 is shown in vertical perspective wherein the floor space of FIG. 1 is shown as the second or middle floor F2. As shown by the dotted signal lines "S" in FIG. 2, the antennas of the present invention effectively read tags which are placed on objects on a single floor of the structure in such a manner so as not to provide the readers 12 which are connected to control computers (not shown) with signals from RF tags placed on floors F3 and F1, above and below floor F2. Therefore, the antennas have controlled vertical beam widths which limit signals being received to a vertical distance of approximately of a height of floor one. Although some weak signals may be received from the first and the third floors using the antennas of the present invention, the signals are easily identified as being received from tags outside of a desired vertical range of the antennas.

As noted from FIGS. 1 and 2, the antennas of the present invention also have the ability to receive signals in a horizontal area both in front of or behind a placement area of the antennas, as well as to each side of the antennas. The antennas are mounted such as depending from a ceiling or mounted within a ceiling or mounted to a wall within the structure. The positioning of each antenna can be slightly altered so that the antennas can be tuned to provide for maximization of receiving efficiency depending upon the types of material which are present in the building structure. For instance, in some environments such as hospitals, some interior walls may be lined to prevent X-ray radiation from escaping a room. Such lined walls have a different affect on signals being radiated from a tag mounted to an object located within such a room. Because of such differences in material, in some instances, it may be necessary to alter the orientation of the antennas to maximize the signal receiving efficiency.

Figure 3:
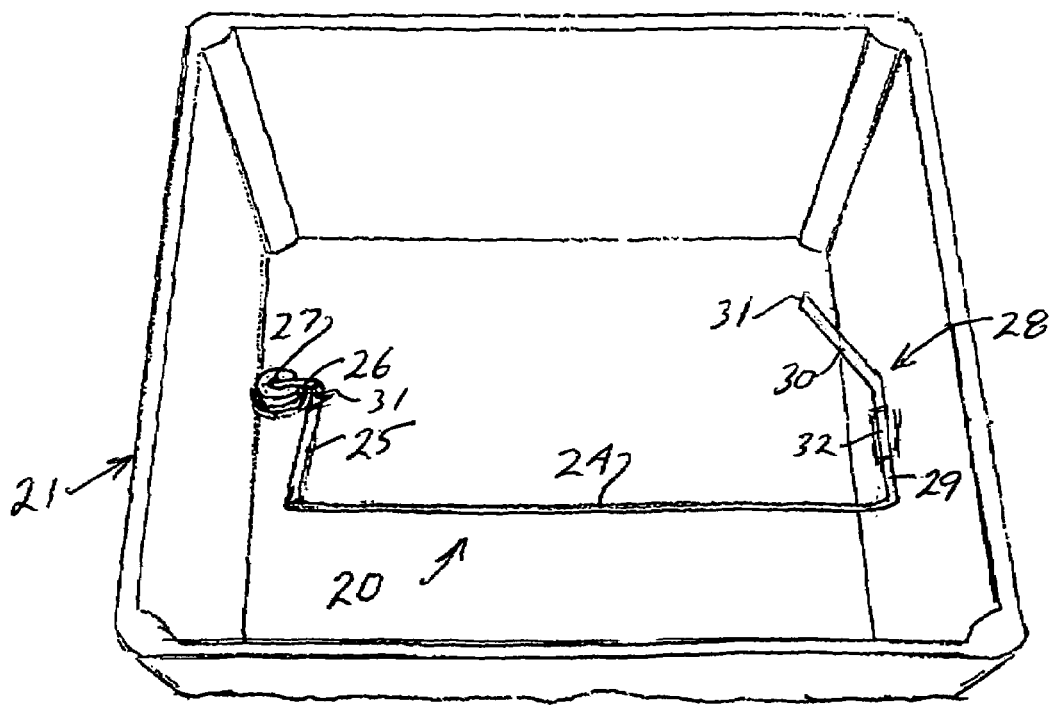
FIG. 3 is a top perspective view of a first embodiment of directional antenna mounted in a protective housing in accordance with the teachings of the present invention.

With particular reference to FIG. 3, a first embodiment of the invention is shown in greater detail. In this embodiment, the antenna 20 is shown as being mounted within a box-like housing 21 having a closure lid (not shown) which seals the antenna therein. The antenna is a directional wire or rod antenna having a central body member 24 which is integrally formed with a first leg 25 having its free end connected at 26 to an electrical terminal 27. Terminal 27 is connected either to a cable which connects the antenna to the reader or to a device for providing a wireless signal to the reader. The readers may be of known design such as MANTIS™ and SPIDER™ readers by RF Code. The leg 25, is shown as extending at generally 90 degrees with respect to the central member 24 and is arranged opposite a second leg 28, which is defined by first and second inner and outer leg segments 29 and 30, respectively. The leg segment 29 also extends at generally a 90 degree angle with respect to the central member 24 with the outer segment extending at a compound angle generally upwardly and inwardly with respect to the central member, such that a free end 31 thereof is generally oriented toward the first leg 25 but not in a line therewith but rather oriented outwardly with respect thereto.

In this manner, the antenna is formed having an electrical tap at one end 26 with the leg segments 25 and 29 being formed as opposite sides of a generally unshaped configuration including the central member 24. However, the leg segment 30 is specifically designed to extend at an angle with respect to a plane defined by an elongated axis of the leg 25 and an elongated axis of the central member 24, such that the free end 31 of leg segment 30 extends outwardly relative such plane but forwardly thereof, as is shown in the drawing figure.

In a preferred embodiment, leg segment 30 is disposed at approximately 45 degrees both inwardly and outwardly as shown in FIG. 3 with respect to the inner leg segment 29.

The wire antenna 20 of FIG. 3 is preferably a metal wire or rod which is coated with copper and may be made of substantially any type of material which is effective to receive RF signals. A composite or adhesive 31, 32 may be applied to secure the antenna in a fixed relationship to the inside of the housing as is shown.

With reference to FIG. 4, another embodiment of the invention is shown which is similar to that of FIG. 3 except that the antenna is designed as a modified or unbalanced dipole antenna 40 having a center tap wire 41 connected centrally of a central member 42 of the antenna. The antenna includes a first leg having a single segment 43 disposed at approximately 90 degrees with respect to the central member on one end thereof and a second leg 45 having an inner segment 46 extending between the central member 42 and an outer leg segment 48. The outer leg segment has a free end 49 oriented outwardly in the same manner as described with respect to the outer segment 30 of the antenna described in FIG. 3.

As with the antenna in FIG. 3, the antenna in FIG. 4 has a plane defined by the leg 43 and the elongated axis of the central member 42. Another plane defined by the second leg 45 would extend transversely at an acute angle with respect to the plane defined by the leg 43 and central member 42. In this embodiment, the inner leg segment 46 of the antenna further is non-parallel with respect to the leg 43 and is angled at approximately 20 degrees with respect thereto. As with the previous antenna, the outer leg segment 48 extends upwardly and outwardly relative to the inner leg segment at a compound angle of approximately 45 degrees. The center tap wire 41 is connected at 50 to an electrical hardwire connection or to a wireless transmitter which connects to the reader as previously described. Adhesive or composite material 31, 32 may be used to secure the antenna within the housing 21.

Figure 5:
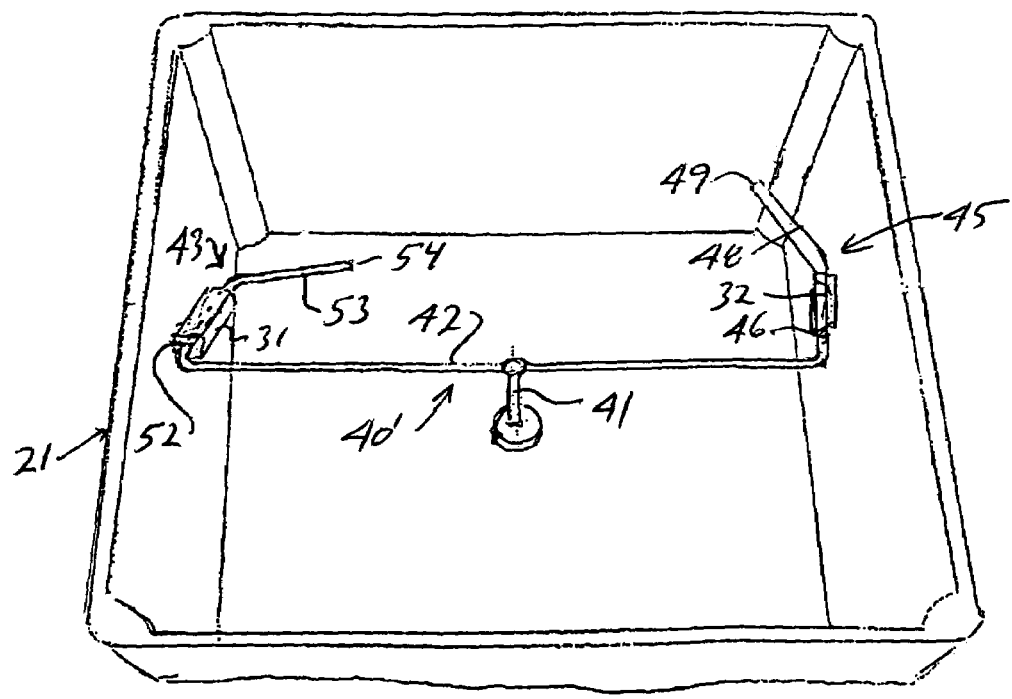
FIG. 5 is a top perspective of the third embodiment of directional antenna in accordance with the teachings of the invention mounted within a protective housing.

With specific reference to FIG. 5, a further embodiment of the invention is shown which is similar to the embodiment shown in FIG. 4. In this respect, the components of the antenna 40' which are the same have the same reference numbers. Therefore, in this embodiment, there is a center tap wire 41 connected to the center member 42. There is a first leg 43, however, the first leg has an inner leg segment 52 and an outer leg segment 53 having a free end 54 which is oriented generally toward the second leg 45. The inner and outer segments 46 and 48 of the second leg are generally configured as previously described with respect to the embodiment of FIG. 4. In this embodiment, the inner leg 43 is provided with two leg segments, as opposed to the one leg segment disclosed in FIG. 4.

Figure 6:
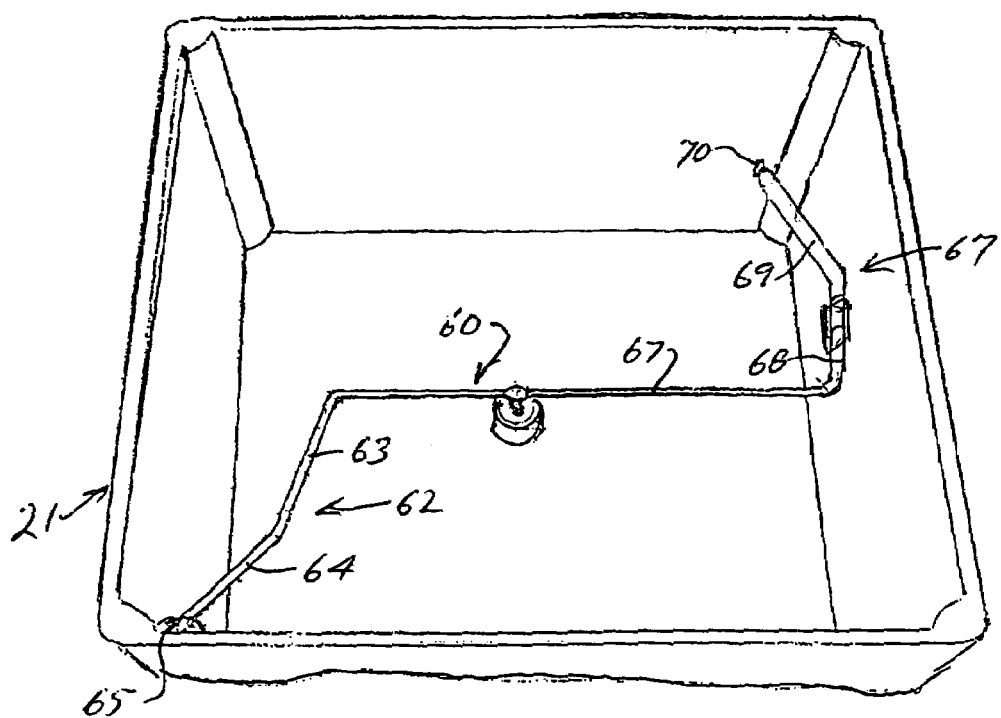
FIG. 6 is a top perspective of a directional antenna in accordance with the teachings of the invention mounted within a protective housing.

With specific reference to FIG. 6, a further embodiment of the invention is shown in greater detail. In this embodiment, the antenna 60 includes a central member 66 is connected at one of its opposite ends to a second leg 67 having an inner segment 68 and outer segment 69 which terminates at free end 70. The configuration of the second leg 67 is generally identical to that described with respect to the embodiments of FIGS. 4 and 5. However, in this embodiment, a first leg 62 is oriented in a reverse direction with respect to the embodiment shown in FIG. 5.

In this embodiment, an inner leg segment 63 of first leg 62 extends in an opposite direction with respect to the inner segment 68 of the second leg 67 and an outer leg segment 64 extends upwardly at approximately 45 degrees with respect to the inner segment 63, such that a free end 65 of the outer segment 64 extends generally away from an outer free end 70 of the outer segment 69 of the second leg 67.

The antennas have been designed to operate at operating frequencies in a range between 1 MHz and 1 GHz and may be tuned electronically and also by physical rotation of the antennas when they are placed within a facility. The antennas are generally designed so that the leg segments extend above the central member in mounted relationship relative to a ceiling, however, is some environments, the orientation of the leg segments relative to the central members of the antennas may vary. Further, the antennas may be end tapped antennas as opposed to central taps as shown in the embodiments of FIGS. 4, 5 and 6, and still fall within the operating characteristics of the present invention.

To aide in the understanding of the compound angular orientation of the outer leg segments of each of the embodiments of the invention, FIGS. 7-9 are views taken from different angles of some of the embodiments of the invention. FIG. 7 shows a side perspective view of the embodiment of FIG. 6 wherein both the angles of the first and second leg segments are shown. Note that the outer segment 69 extends both inwardly and upwardly, preferably at approximately 45 degrees in each direction. The outer segment 64 extends upwardly also at approximately 45 degrees and outwardly. FIG. 8 is a side elevational view of the antenna of FIG. 7.

FIG. 9 is a side view of the antenna of FIG. 3

By way of example, and although the dimensions of each antenna may vary, the dimensions of a prototype antenna such as shown in FIG. 4 are approximately as follows:

| Part | Approximate Dimension (inches) |
| --- | --- |
| Control member 42 | 5.0 |
| First leg 43 | 1.6 |
| Second leg inner segment 46 | 1.5 |
| second leg outer segment 48 | 1.5 |

Dimensions for a prototype as shown in FIG. 5 are approximately as follows:

| Part | Approximate Dimension (inches) |
| --- | --- |
| Control member 42 | 5.0 |
| First leg inner segment 52 | 1.5 |
| First leg outer segment 53 | 1.5 |

| Part | Approximate Dimension (inches) |
| --- | --- |
| Second leg inner segment 46 | .78 |
| second leg outer segment 48 | 1.0 |

Figure 10:
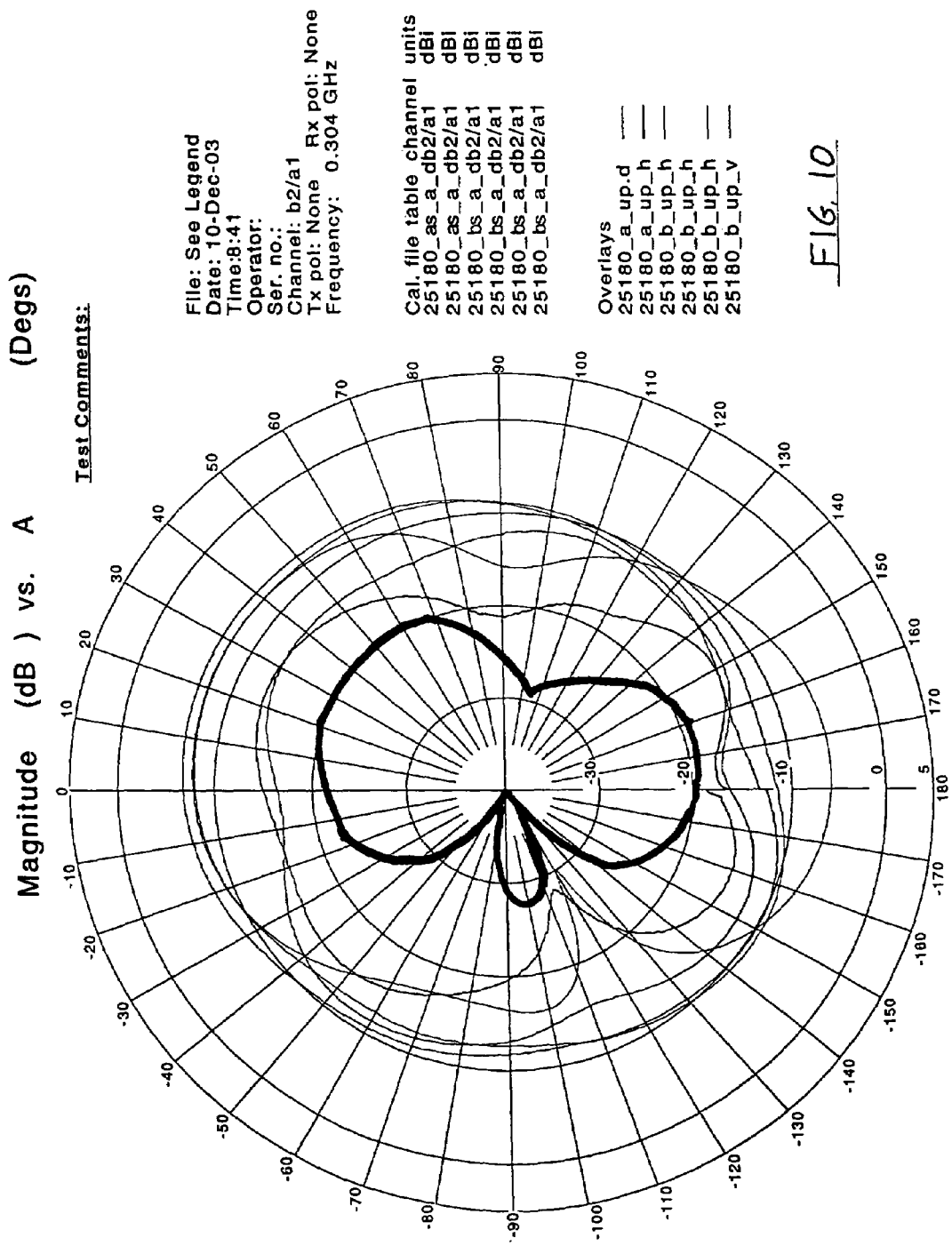
FIG. 10 is a diagram of directional characteristics of the antenna shown in FIG. 5 being operated at a frequency of 0.303 Ghz.
Figure 11:
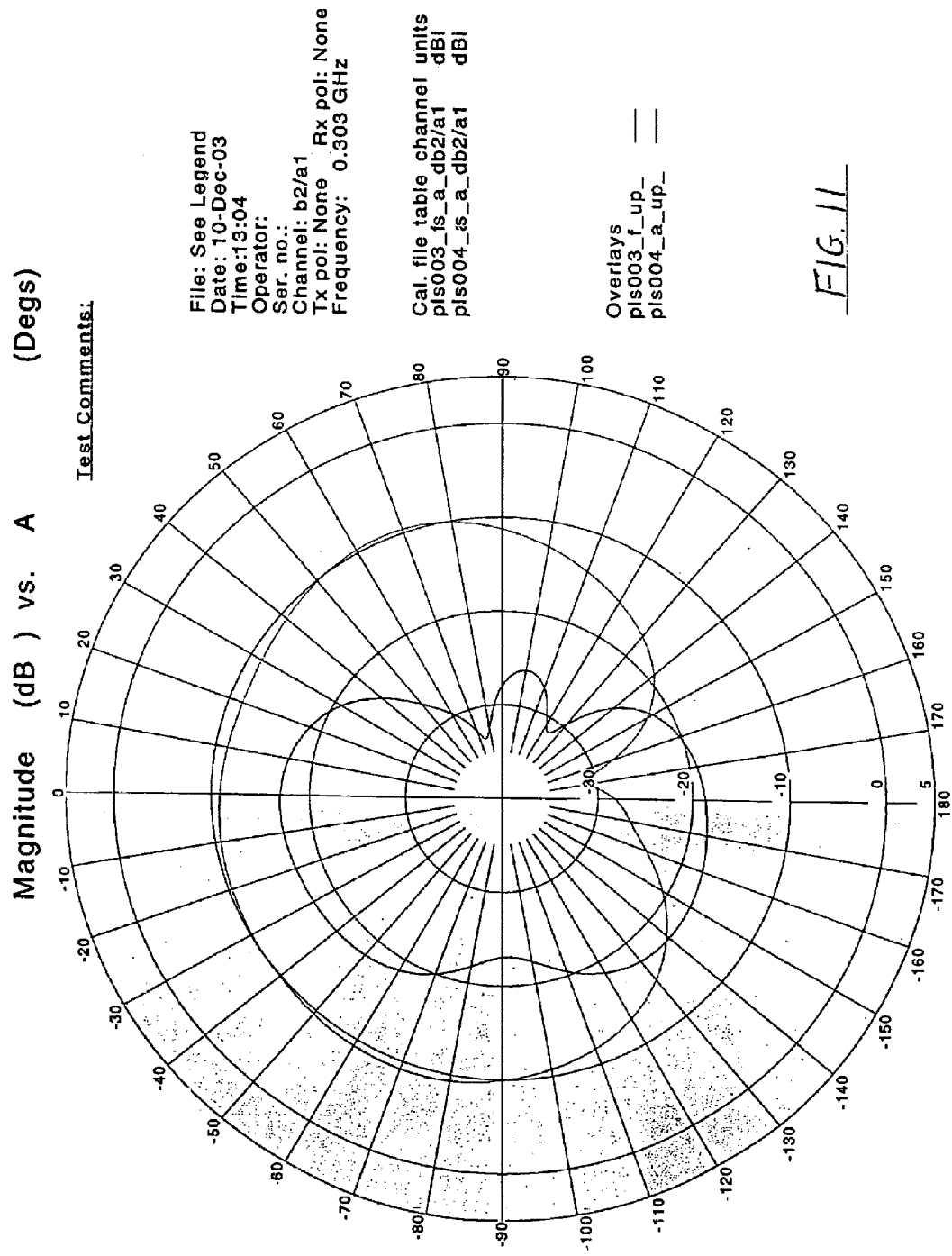
FIG. 11 is a diagram of directional characteristics of the antenna shown in FIG. 6 operating at a frequency of 0.303 GHz.

In order to show the directional characteristics of the antennas of the present invention, FIGS. 10 and 11, respectively, are diagrams of such directional characteristics at a frequency of 0.303 GHz of the embodiments disclosed in FIGS. 5 and 6, respectively. It should be noted, that the range of operation is not omnidirectional for these antennas and these antennas are generally focused having beam angles in a horizontal zone which are greater that a vertical zone so as to decrease any effect which tags placed at vertical levels above a predetermined level will have on the receipt of the signals by the antennas. By controlling the beam angle in the vertical range to be significantly less than in the horizontal range, it is possible that the antennas of the present invention can decrease the number of electrical components which are necessary in a building to correctly monitor that objects are located on a given floor of the building and thus provides a unique advantage over prior art antennas typically used in RFID monitoring systems.

The invention claimed is:

1. A directional wire antenna for radio frequency identification tag systems, the antenna including a wire body having first and second legs extending angularly outwardly from opposite ends of a generally central member, said second leg having inner and outer segments which are angularly oriented relative to one another such that a portion of said central member and said second leg are in somewhat of a u-shaped configuration with said portion of said central member and said outer segment of said second leg being connected by said inner segment of said second leg and said outer segment of said second leg extending at a compound angle relative to a longitudinal axis of said portion of said central member and terminating in a free end.

2. The directional wire antenna of claim 1 wherein an elongated axis of said outer segment of said second leg traverses an elongated axis of said inner segment of said second leg at approximately a 45 degree angle.

3. The directional wire antenna of claim 1 wherein said first leg includes an inner segment extending outwardly from said central member such that said central member, said inner segment of said first leg and said inner segment of said second leg form a generally u-shaped configuration.

4. The directional wire antenna of claim 3 wherein a free end of said first leg is connected to an electrical tap for the antenna.

5. The directional wire antenna of claim 3 wherein an electrical tap for the antenna is provided along said central member.

6. The directional wire antenna of claim 3 wherein said inner and outer segments of said second leg define a plane which extends transversely with respect to a plane defined by said inner segment of said first leg and said central member.

7. The directional wire antenna of claim 3 wherein said inner segment of said first leg and said inner segment of said second leg are not parallel with one another.

8. The directional wire antenna of claim 6 wherein said inner segment of said second leg is oriented at approximately 20 degrees relative to said plane defined by said inner segment of said first leg and said central member.

9. The directional wire antenna of claim 3 wherein said first leg includes an outer segment extending from said inner segment of said first leg and terminating in a free end.

10. The directional wire antenna of claim 9 wherein said free end of said outer segment of said first leg is oriented generally towards said second leg and such that said first leg and a second portion of said central member are generally unshaped in configuration.

11. The directional wire antenna of claim 10 wherein an electrical tap for the antenna is provided along said central member.

12. The directional wire antenna of claim 1 wherein said first leg extends from one of said opposite ends of said central member in a direction generally opposite to a direction at which said second leg extends from the other of said opposite end of said central member.

13. The directional wire antenna of claim 12 in which said first leg includes at least two segments including an inner segment extending from said one of said opposite ends of said central member and an outer segment angularly oriented relative to said inner segment and terminating in a free end.

14. The directional wire antenna of claim 13 wherein said free end of said first leg and said free end of said second leg are oriented in generally opposite directions on opposite sides of said central member.

15. The directional wire antenna of claim 1 including a housing, and means for mounting said antenna within said housing.

16. The directional wire antenna of claim 1 wherein said antenna is adapted to be operable in energy ranges of approximately 1 MHz to 1 GHz.

17. The directional wire antenna of claim 1 wherein a relative configuration of said first and second legs and said central member is such that a beam angle defined by the antenna is wider in a horizontal direction than a vertical direction.

18. A method for reading radio frequency identification tags within a structure having multiple vertically spaced levels wherein objects on the multiple levels have radio frequency tags applied thereto, the method comprising the steps of:
   a) providing a directional wire antenna for a radio frequency identification tag system wherein the antenna includes a wire body having first and second leas extending angularly outwardly from opposite ends of a generally central member and wherein the second lea has inner and outer segments which are angularly oriented relative to one another such that a portion of the central member and said second leg are in somewhat of a u-shaped configuration with the portion of said central member and the outer segment of the second leg being connected by the inner segment of the second leg and the outer segment of the second leg extending at a compound angle relative to a longitudinal axis of the portion of said central member and terminating in a free end and placing the directional antenna along one of the plurality of levels and orienting the antenna to receive RF signals from tags on the one of the plurality of levels, and
   b) communicating the directional antenna with means for reading signals received by the antenna to identify objects only located on the one of the plurality of levels whereby the directional antenna effectively receives radio frequency signals from the tags on the one of the plurality of levels without bleed-over from signals from tags on other levels.

19. A method for reading radio frequency identification tags within a structure having multiple vertically spaced levels wherein objects on the multiple levels have radio frequency identification tags applied thereto, the method comprising the steps of:
   a) placing at least one antenna having a limited vertical beam bandwidth which is generally less than a distance between floors of adjacent vertical levels on one of the plurality of levels and orienting the at least one antenna to receive RF signals from tags on the one of the plurality of levels, and
   b) communicating the at least one antenna with means for reading signals received by the at least one antenna to identify objects only located on the one level whereby the at least one antenna effectively receives radio frequency signals from the tags on the one level without bleed-over from signals from tags on other levels.

* * * * *